H. O. WESTENDARP & J. A. McMANUS, Jr.
VENTILATOR.
APPLICATION FILED AUG. 9, 1915.
1,201,780.
Patented Oct. 17, 1916.
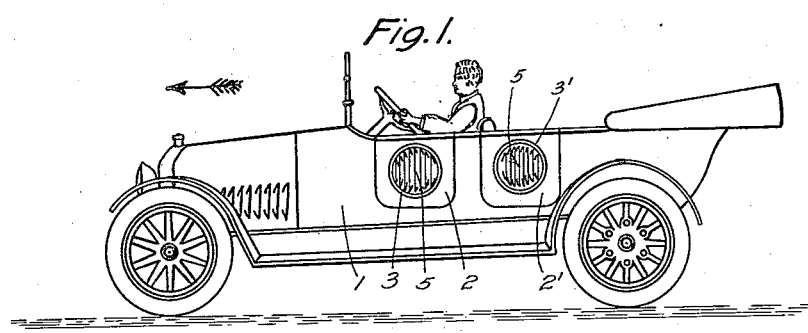
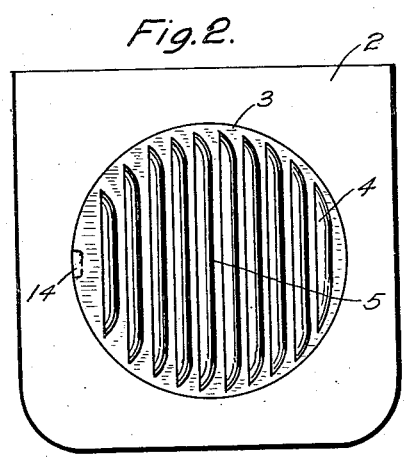
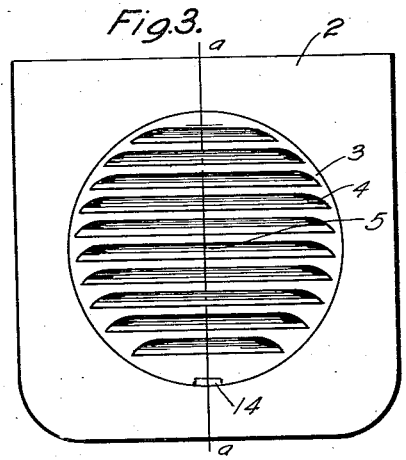
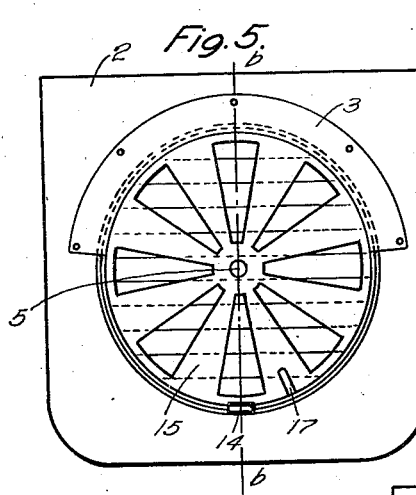
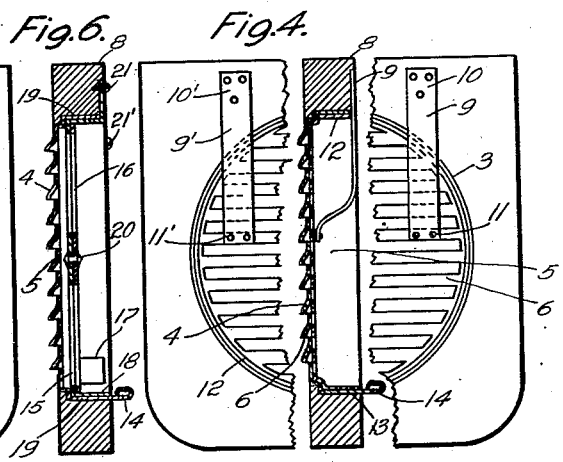
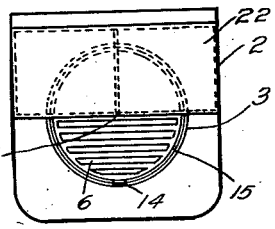
WITNESSES
Charles H. Kershaw
Robert Shand
INVENTORS
Henry O. Westendarp,
John A. McManus, Jr.
By John A. McManus, Jr.
Att'y.

UNITED STATES PATENT OFFICE.

HENRY O. WESTENDARP, OF SAUGUS CENTER, AND JOHN A. McMANUS, JR., OF WEST LYNN, MASSACHUSETTS.

VENTILATOR.

1,201,780.  Specification of Letters Patent.  Patented Oct. 17, 1916.

Application filed August 9, 1915. Serial No. 44,501.

*To all whom it may concern:*

Be it known that we, HENRY O. WESTENDARP and JOHN A. McMANUS, Jr., citizens of the United States, residing at Saugus Center and West Lynn, respectively, county of Essex, State of Massachusetts, have invented certain new and useful Improvements in Ventilators, of which the following is a specification.

The present invention relates to improvements in ventilators, and more particularly to ventilators capable of being utilized with great efficacy when applied to vehicles, self-propelled or otherwise.

The invention has for its object to provide a means for ventilation which will be flexible in its range of adjustment to meet all conditions of wind or weather, one which shall be cheap to manufacture, and furthermore to provide a ventilator which may either be incorporated in a vehicle specially designed to include it or which may be readily and quickly applied to existing vehicles not so specially designed.

In the design and application of appurtenances for automobile vehicles, since the so-called "fore-door" type of vehicle has come into vogue, a number of devices have been made to meet the requirement for ventilation necessitated by the utilization of such "fore-door" vehicles wherein the heat from the engine becomes a source of discomfort, but these devices have failed in certain respects to meet the requirements most efficiently and in a manner adapted for cheaply and easily applying them to existing vehicles not especially designed for their use.

The objects of our invention are more particularly accomplished by providing a ventilator wherein adjustable shrouds or gills are revolved about a central point or axis of revolution in such a manner as to coöperate with a suitable grid or valve on the inner side of the ventilator and thereby permit variations of adjustment in the opening and closing of the ventilator. The gills have a flexibility of adjustment throughout a variable range of operation which permits either the maximum opening of the ventilator or any obtainable fraction thereof, depending upon the interrelation of the gills and grid. If the gills are open forwardly in the direction of motion of the vehicle, air is injected into the vehicle, and if the said gills are turned in the opposite direction say, 180°, for example, oppositely to the direction of motion of the vehicle, ejection of air from the vehicle is obtained. The gills employed are somewhat similar to those utilized for ventilation of automobile hoods, only that they are adjustable to coöperate with a grid on the inner side of the ventilator, the said grid acting as a valve for the admission or exclusion of air through the ventilator. In fact, our improved form of ventilator may be applied with advantage (in certain minor modifications to meet the special requirements) to the ventilation of self propelled vehicle motors by placing such ventilators in the hood. With the present type of gill ventilator commonly employed for this purpose the gill opening is fixed in position, with the result that during a storm that is driving in the direction of the gill opening, the rain, sleet and snow can enter through these openings and cause no end of trouble with the high tension ignition systems, preignition, back-firing, etc., due to wet or moisture. With the employment of our ventilator in such a case, it is only necessary to turn the gills on their axes of revolution until the openings are in the direction away from the storm and protected by the shrouds of the ventilator therefrom. Or, if desired, the ventilator may be closed entirely.

The details of construction and operation of our improved ventilator will be more clearly understood by reference to the accompanying specification and drawings wherein—

Figure 1 represents an automobile to which our improved ventilator is applied by embodiment in the doors of the vehicle although it is to be understood that it need not necessarily be embodied in the door, but may be located in any desirable and effective location in the body of the vehicle, such for example, as in the side of the cowl; Fig. 2 represents an automobile door in which the gills and grid are adjusted so as to permit the injection of air into the vehicle body when said vehicle is moving in the direction of the arrow, Fig. 1; Fig. 3 represents a vehicle door wherein the gills are adjusted so as to close the ventilator and shut off all injection or ejection of air into or out of the vehicle through the ventilator; Fig. 4 is a view of the inside of the preferred form of our ventilator showing the grid and gills in closed position and also a transverse sectional elevation of the parts on the line *a—a*, Fig. 3. This view also shows one method of holding the grid stationary by means of suitable spring-pressed members; Fig. 5 represents a modification of our improved form of ventilator showing the inner side thereof wherein a stove-damper type of adjuster is used as a valve and with gills for controlling the admission and ejection of air through said valve when the valve is open; Fig. 6 is a transverse sectional elevation of the parts shown in Fig. 5 on the line *b—b* thereof in such relation of the parts that the ventilator is open; Fig. 7 represents a modification wherein a suitable pocket may be provided on the inside of the ventilator should the latter be embodied in a vehicle door.

Like numerals represent like parts throughout.

In Fig. 1, 1 represents the body of an automobile to which our invention may be applied; and 2 and 2' doors in which the ventilator may be embodied; 3 and 3' the ventilators. 4 represents the adjustable gills or shrouds revoluble about a central point or axis 5. 6 represents the grid on the inner side of the ventilator. The grid 6 may be made of punched steel or other suitable material and be merely dropped into place in the frame 8 of the ventilator or in the door 2 if the ventilator is to be embodied in a door. The grid or valve 6 is held in the frame or door by means of spring-pressed members 9 or their equivalent. The grid, while being thus easily located in its place, is prevented from looseness and consequent rattle due to the motion of the vehicle. The spring-pressed members 9 may be suitably fastened to the frame or door as indicated at 10, 10' and 11 and 11'. Felt padding may be utilized wherever advisable to prevent noise or rattle of the parts. The grid 6, Fig. 4 is provided with an inturned portion 12 concentric with which is an inturned portion 13 of the gill member 4. This inturned portion 13 is provided with a handle 14 for adjusting the gill member 4. While the handle 14 is shown on the inner side of the ventilator preferably it will be understood that, if desired, the handle could be attached to the gill members in such a manner that the gill member could be adjusted from the outside instead of from the inside of the ventilator.

In the modification, Figs. 5 and 6, 15 represents a grid of the stove-damper type, and seen from the inside of the vehicle, the member 15 having openings coöperating with an adjustable valve closer or damper 16, the latter being provided with a handle 17 for moving said damper to open or close the valves in the member 15. The member 15 has an inturned flange 18, and surrounding the flange or concentric therewith is an inturned portion or flange 19 having a handle 14 for operating the gill member 4, similar to the gill used in the construction, Fig. 4.

The members 15 and 16 are fastened together by means of a common pivot 20 and around which the member 15 turns when it is adjusted by means of the handle 17. The gill member 4 turns about a central point or axis 5 as in the other figures, when the handle 14 is turned. The member 15 may be held in place in any suitable manner, as by means of screws 21, 21', and is cut away for a portion of its circumference in order to allow the handle 14 to be turned through its working arc.

It will be seen that, as in the preferred form of our invention, Fig. 4, it is only necessary to turn the gill member 4 ninety degrees either side of the closed position of the ventilator, Fig. 3 in order to secure the entire range of adjustment or a total angular adjustment of the handle 14 of 180° from a position of injection of air into the vehicle to a position of ejection of air therefrom, it being assumed that the vehicle is moving in the direction of the arrow, Fig. 1. In Figs. 5 and 6, however, the ventilator may be closed or opened regardless of the position of the gills, by merely closing or opening the damper 16.

In Fig. 7, wherein a pocket is shown of leather or other suitable material 22, the upper portion of the ventilator may be covered on the inside by the pocket, and in this case it also adds to the efficiency of the ventilator as it functions as a deflector for assisting in throwing the air downwardly to the floor of the vehicle. If desirable, a separate deflector may be used for the purpose, but it is not deemed necessary to illustrate such separate deflector herein.

The operation of our invention is as follows: Assuming that the vehicle is traveling in the direction of the arrow, Fig. 1, and that the ventilator is in the closed position as shown in Fig. 3, if it is desired to open the ventilator and inject air into the vehicle body, the handle 14 is turned to a position corresponding to that shown in Fig. 2 and air is thus injected into the vehicle. If the ventilator is open in this position and a driving rain, sleet or dust storm should come up and it is desirable to avoid the injection, but at the same time get rid of the hot air within the vehicle body, it is only necessary to turn the handle 14, 180° in the opposite direction, as shown in the rear door, Fig. 1, when the wind or storm will be shut out from the vehicle body but the heated air from the engine in said body can still be ejected. Should it be desirable to close the ventilator entirely, the handle 14 is returned to the position, Fig. 3, and the valve grid will be closed, and the effect of an entirely closed door will be obtained.

Variable combinations can be obtained by adjusting opposite ventilators in opposite relationship, such, for example, as opening the ventilator in one door so as to inject air into the vehicle and opening the opposite ventilator in another door in a manner to eject air therefrom. Thus, a cross-draft may be secured which sweeps through the vehicle body.

Of course, it will be understood that many modifications of our improved form of ventilator may be made within the spirit and scope of our invention adapting it to be used for special applications, but in accordance with the provisions of the patent statutes, we do not wish to be interpreted as limiting ourselves to the exact constructional features shown and described herein but desire to cover by the appended claims all the modification within such spirit and scope.

What we claim as new and desire to secure by Letters Patent of the United States is:

1. In a ventilating device, a diaphragm or grid provided with openings, a rotary gill or hood member, means rotating with said hood member and coöperating with said diaphragm to form valves, and means angularly adjusting the relation of the gill member and its coöperating means with respect to the external atmosphere and the diaphragm respectively.

2. In a ventilating device, a diaphragm or grid provided with openings, a rotary gill or hood member, means rotating with said hood member and coöperating with said diaphragm to form valves, and means for angularly adjusting the relation of the gill member and its coöperating means to shut off exchange of air through the ventilator or to open the valves to cause injection or ejection of air through said valves as desired.

In testimony whereof we have affixed our signatures.

HENRY O. WESTENDARP.
JOHN A. McMANUS, Jr.